Figure 1:
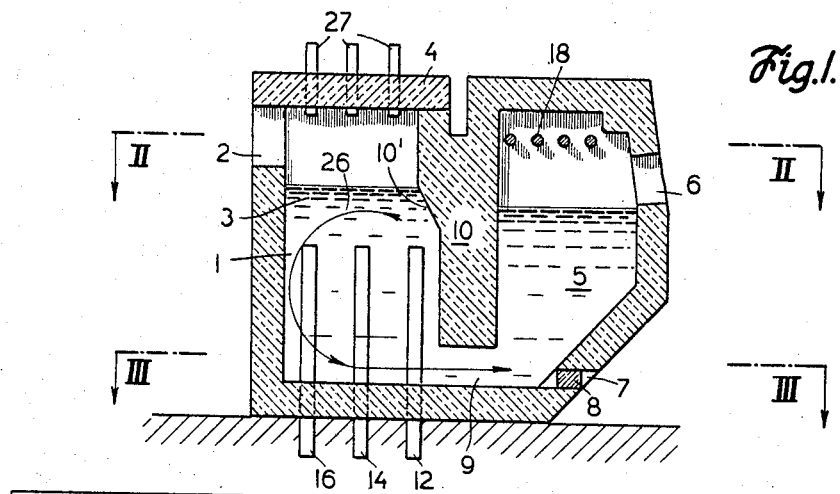

United States Patent Office 3,378,618
Patented Apr. 16, 1968

3,378,618
ELECTRIC GLASS FURNACE
Josef Vach and Václav Süsser, Hradec Kralove, Czechoslovakia, assignors to Statni Vyzkumny ustav Sklarsky, Hradec Kralove, Czechoslovakia
Filed Dec. 13, 1965, Ser. No. 513,863
Claims priority, application Czechoslovakia Dec. 15, 1964, 7,077/64
9 Claims. (Cl. 13—6)

The present invention relates to an electric glass furnace.

Electric glass furnaces are known in the art which include a melting chamber and an adjacent working chamber separated by a separating wall from the melting chamber and in which a passage is formed in the lower portion of the seprating wall so that the molten glass in the melting chamber may pass into the working chamber. In such a furnace arrangement a descending flow of molten glass will be created in the melting chamber along the portion of separating wall over the passage during flow of molten glass from the melting chamber into the working chamber of the furnace, which may result in undesirable flow of improperly refined glass melt into the working chamber of the furnace. There is known a furnace provided with plate electrodes arranged opposite to each other along the side walls of the melting chamber by which arrangement it is partly possible to create an ascending current in the glass melt before the passage which connects the melting chamber with the working chamber. The disadvantage of such a furnace is, however, the one-phase connection of the electrodes and the more difficult handling of the plate electrodes as compared with bar electrodes.

Two kinds of electric furnaces for glass are known, that is furnaces in which convection currents are created and furnaces in which substantially no convection currents are created. The furnaces with convection currents have the disadvantage that a turbulence is created in the molten glass in the melting chamber of the furnace which, on the one hand, increases the danger of passage of improperly refined glass melt and of unmolten glass particles into the working chamber of the furnace, and, on the other hand, causes a more intensive corrosion of the refractory material forming the walls of the furnace.

To overcome the undesirable effects of convection currents, several types of furnaces have been designed in which the convection currents are nearly eliminated by such an arrangement of the electrodes in the melting chamber so as to keep a substantially uniform temperature within the entire melting chamber of the furnace. In such a furnace for instance six electrodes may be arranged at the corners of a regular polygon and fed by three-phase current of the same electrical input for all electrodes, or even a greater number of electrodes, which number has to be a multiple of three, may be arranged on different levels of the melting chamber of the furnace. Such an arrangement will substantially eliminate turbulence in the glass melt in the melting chamber but, of course, also eliminate favorable effects of the convection current which provide for a homogenization of the glass melt in the melting chamber, while the descending current near the separating wall during flow of glass melt from the melting into the working chamber remains effective, that is improperly refined glass melt is not prevented from flowing into the working chamber of the furnace.

It is an object of the present invention to provide for an electric glass furnace which overcomes the disadvantages of electric glass furnaces known in the art.

It is an additional object of the present invention to provide for an electric glass furnace in which excessive turbulence in the melting chamber is avoided, but in which convection currents are created in the melt in such a way that an ascending current is created along the separating wall separating the melting chamber from the working chamber of the furnace, and a descending current along a wall of the melting chamber which is opposite the aforementioned separating wall so that molten glass in the melting chamber will be circulated therein before it will pass through the passage from the melting chamber into the working chamber and so that the time the molten glass is kept at the highest refining temperature in the melting chamber is extended.

It is an additional object of the present invention to provide for an electric glass furnace of the aforementioned kind which is constructed of relatively few and simple parts so that the furnace can be manufactured at reasonable cost and will stand up trouble free under extended use.

With these objects in view, the electric furnace according to the present invention mainly comprises wall means defining a melting chamber, an adjacent working chamber, and a passage extending from the lower end of one wall of the melting chamber into a lower portion of the working chamber so that molten glass may flow through the passage from the melting chamber into the working chamber. Three groups of electrodes with at least two electrodes in each group are arranged in the melting chamber and the electrodes in the respective group are arranged in vertical planes extending substantially parallel to the aforementioned one wall of the melting chamber and the electrodes of one of the three groups are arranged adjacent said one wall of the melting chamber, whereas the second group of electrodes is arranged intermediate said one wall and the wall of the melting chamber opposite said one wall, and the third group of electrodes is arranged adjacent the opposite wall. The furnace includes further means for supplying electric energy to the electrodes of each group, and regulating means for regulating at least the energy supplied to said one group of electrodes adjacent said one wall of the melting chamber in such a manner that the energy supplied to said one group of electrodes is greater than the energy supplied to the other two groups of electrodes, so as to produce an updrift in the molten glass in the melting chamber along said one wall and so that molten glass will be circulated in the melting chamber and flow upwardly along the one wall, across the level of molten glass in the melting chamber to the opposite wall downwardly along the opposite wall and along the bottom wall of the melting chamber before it may pass through the passage into the working chamber.

The electrical energy supplied to the second group of electrodes intermediate the one and the opposite wall of the melting chamber may be equal or preferably be greater than the energy supplied to the electrodes adjacent the opposite wall of the melting chamber.

By this arrangement the temperature in the space near the one wall of the melting chamber through which the passage leads from the melting chamber into the working chamber is thus the highest and the temperature decreases in direction from said one wall towards the opposite wall whereby convection currents are created in the glass melt producing the aforementioned upwardly flow along the one wall of the melting chamber and flow of molten glass across the level of the molten glass in the melting chamber to the opposite wall, downwardly along the opposite wall and along the bottom wall of the melting chamber toward the inlet end of the channel.

By this control and directing of the convection currents excessive turbulence in the glass melt is eliminated, while the convection currents will still provide for a favorable homogenizing effect in the glass melt. In addition thereto the time during which the glass melt, remains at the highest refining temperature in the melting chamber is extended, whereby a perfect refining of the glass melt is obtained and undesirable flow of unmolten particles into the working chamber of the furnace is avoided.

According to a further feature of the present invention the electrodes are arranged in the melting chamber in such a manner that the distance between the electrodes in the one group adjacent the one wall of the melting chamber and the distance between the electrodes in the third group adjacent the opposite wall is greater than the distance of each electrode in the second group of electrodes from the electrodes of the other two groups adjacent to the respective electrodes of the second group. In this arrangement the melting chamber may have a substantially square or rectangular cross section and the electrodes are arranged in the melting chamber in such a manner that "dead" corners in the melt which are not subjected to the influence of the electrodes are eliminated.

According to a further feature of the present invention, the width of the passage connecting the melting chamber with the working chamber exceeds half the width of the melting chamber. By thus extending the width of the passage as compared with passages in known furnaces, the passage cross section is increased while the height of the passage can be held to a minimum. This relatively reduced height of the passage will increase the updrift of molten material along the separating wall, while the relatively increased cross section of the passage will reduce the speed of flow of glass melt therethrough which reduces the risk of entrainment of non-molten and non-refined glass into the working chamber and which results also in a diminished corrosion of the walls forming the passage.

In bigger furnaces where the separating wall has to be supported for structural reasons, two passages are preferably provided through this separating wall and the arrangement is made in such a manner that the combined width of these passages exceeds half the width of the melting chamber.

Figure 2:
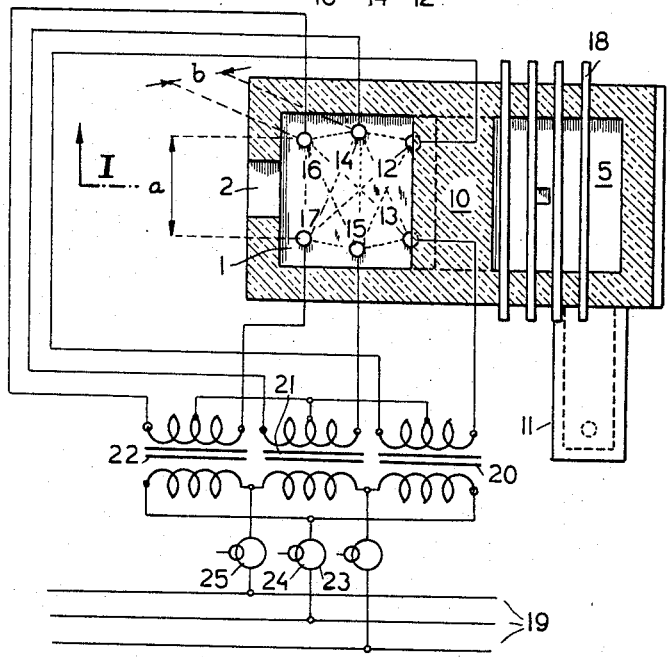
Figure 3:
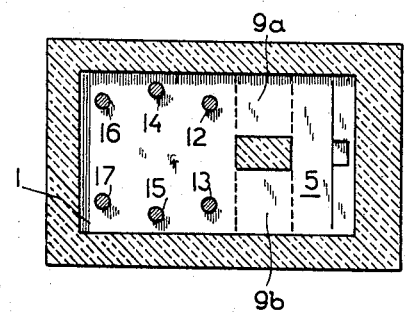

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawings, in which:

FIG. 1 is a longitudinal cross section through a furnace according to the present invention, the section being taken along the line I—I of FIG. 2;

FIG. 2 is a cross section view taken along the line II—II of FIG. 1, and FIG. 2 shows also schematically the means for supplying electrically current to the electrodes in the melting chamber of the furnace; and FIG. 3 is a horizontal cross section taken through a lower portion of a furnace according to the present invention, FIG. 3 being drawn to a smaller scale than the other two figures and showing the furnace in which two passages are provided between the melting and working chamber of the furnace.

Referring now to the drawings, and more particularly to FIGS. 1 and 2 of the same, it will be seen that the glass furnace according to the present invention comprises a melting chamber 1 and an adjacent working chamber 5 separated from the melting chamber by a separating wall 10. The melting chamber 1 is closed at the upper end thereof by a removable lid or cover 4 and is formed in the wall opposite the separating wall 10 with a opening 2 for filling glass forming material 3 into the furnace. A passage 9 formed through the bottom end of the separating wall 10, provides communication between the melting chamber 1 and the working chamber 5. The melting chamber 1 is preferably square in cross section and the passage 9 has a width exceeding half of the width of the melting chamber and preferably, as indicated in FIG. 2, a width equal to that of the melting chamber. The working chamber 5 is provided with an outlet opening 7 closed by a removable plug 8 and in the upper part thereof the working chamber is formed with a working opening 6. Additional discharge means 11 of known construction may be connected to the working chamber 5, as shown in FIG. 2, which may, for instance, be used for continuously or intermittently discharging refined glass from the furnace directly to a glass working machine.

The melting chamber 1 of the furnace is heated by means of vertical bar electrodes 12–17 which may extend, as shown in FIG. 1, into the melting chamber through the bottom wall thereof. A plurality of gas burners 27 extending through the lid 4, are provided, for starting of the melting operation. Additional electrical heating means are provided in the working chamber 5 and these additional electrical heating means are shown in FIGS. 1 and 2 as resistance bars 18 extending spaced from each other transversely through an upper portion of the working chamber 5. The connection of the bars 18 to a source of current supply is not shown in the drawing.

The electrodes 12–17 are arranged respectively at corners of a hexagon, whereby the electrodes 12 and 13 are arranged in a plane substantially parallel and adjacent the separating wall 10 whereas the electrodes 16 and 17 are arranged in a plane parallel thereto adjacent the wall of the melting chamber opposite the separating wall 10. The electrodes 14 and 15 are arranged in a plane parallel to and intermediate the planes in which the electrodes 12 and 13, respectively the electrodes 16 and 17 are located. As can be seen from FIG. 2 the spacing $a$ between the electrodes 16 and 17 is equal to the spacing between the electrodes 12 and 13, whereas the electrodes 14 and 15 are spaced from the electrodes in the two other groups adjacent thereto a distance $b$ which is smaller than the distance $a$. This arrangement will assure that the electrodes 12, 13, 16 and 17 are located adjacent the corners of the melting chamber 1 so that "dead" corners are avoided with this arrangement.

The three groups of electrodes 12, 13; 14, 15; and 16, 17 which are respectively arranged in three planes substantially normal to any flow of material through the passage 9 are fed with electric current in such a way that the electric energy supplied to the first group of electrodes 12, 13 which are nearest to the separating wall 10 is greater than the energy supplied to the second group of electrodes 14, 15 and the energy supplied to this second group of electrodes is preferably greater than the energy supplied to the electrodes 16 and 17 mounted near the wall which is opposite to the separating wall 10.

The three groups of electrodes are supplied with electrical energy from a three-phase network 19 by means of transformers 20, 21 and 22. As shown in FIG. 2 the electrodes 12 and 13 adjacent the separating wall 10 are respectively connected to the ends of the secondary winding of the transformer 20, the electrodes 14 and 15 of the second group of electrodes are respectively connected to the ends of the secondary winding of the transformer 21, and the electrodes 16 and 17 of the third group are respectively connected to the ends of the secondary winding of the transformer 22. The centers of the secondary windings of the transformers 20, 21 and 22 are interconnected so that a six-phase arrangement is obtained. The primary windings of the transformers 20, 21 and 22 are delta connected to each other and connected to the three-phase network 19 respectively over three voltage regulating means 23, 24 and 25 which permit to regulate the voltage respectively supplied to the transformers independent from each other. Any known voltage regulating means for instance voltage regulating transformers may be used for this purpose and the specific voltage regulating means used does not form part of the present inventon. The voltage regulating means 23–25 are adjusted in such a manner that the three groups of electrodes are supplied with electric energy in the manner as mentioned above.

Due to the specific supply of electrical energy to the three groups of electrodes, the temperature in the glass melt 3 adjacent the separating wall 10 will thus be the highest and the temperature will decrease in direction toward the wall of the melting chamber 1 which is opposite the separating wall 10. This temperature difference thus created in the various portions of the glass melt in the melting chamber 1 will create an updrift of the melt in the melting chamber 1 along the separating wall 10 so that the melt in the melting chamber will be circulated therein and flow upwardly along the separating wall 10, across the level of the melt in the melting chamber to the wall opposite the separating wall 10, downward along this opposite wall along the bottom wall of the melting chamber as indicated by the flow line 26 shown in FIG. 1. An upper inwardly inclined surface portion 10' on the separating wall 10 will further this circulation. By thus creating controlled convection currents in the glass melt in the melting chamber 1 excessive turbulence in the melt is avoided while the time during which the glass melt will remain in the melting chamber and subjected to the high refining temperature therein is extended so that a perfect refining of the glass melt is obtained before the latter will flow into the working chamber of the furnace.

An important feature of the construction is further that the width of the passage 9 is preferably made equal to the width of the melting chamber 1 so that not only dead corners are avoided in the melting chamber while the speed of flow of the glass melt through the passage 9 is reduced so that entrainment of bubbles and unmolten particles of the batch into the working chamber 5 is avoided.

If the furnace is made so large that for structural reasons the passage 9 cannot extend uninterrupted between the front and rear wall of the furnace, two passages 9a and 9b are provided as shown in FIG. 3, however, in this construction the combined width of the passages 9a and 9b exceeds also at least half the width of the melting chamber 1.

The above described furnace is operated as follows:

Glass-forming material is fed through opening 2 into the melting chamber 1 of the furnace and the material is initially molten by the heat supplied by the gas burners 27. The molten glass becomes a relatively good electrical conductor at temperature above 1000° C. and further heating of the molten glass is produced by passing current through the electrodes 12–17 in the above described manner, whereby the groups of electrodes are respectively supplied with energy as described above. The glass in the melting chamber is thereby subjected to a refining process which is a chemical as well as a physical process, the purpose of which is to remove gas bubbles caused by decomposition of certain ingredients (fining agents) mixed into the glass-forming material. For the proper refining of the glass it is essential that the glass is subjected as long as possible to the high refining temperature created in the melting chamber and this is accomplished by circulating the glass in the melting chamber by the above described specific manner of supplying the groups of electrodes with electrical energy. An updrift is thereby produced in the molten glass along the separating wall 10 and this updrift and controlled circulation of the molten glass in the melting chamber will prevent entrainment of glass bubbles into working chamber 5 during discharge of refined glass from the latter.

It will be understood that each of the elements described above, or two or more together, may also find a useful application in other types of electric glass furnaces differing from the types described above.

While the invention has been illustrated and described as embodied in an electric glass furnace, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric glass furnace comprising, in combination, wall means defining a melting chamber, an adjacent working chamber, and a passage extending from the lower end of one wall of said melting chamber into a lower portion of said working chamber so that molten glass may flow through said passage from said melting into said working chamber; three groups of electrodes, with at least two electrodes in each group, arranged in said melting chamber, the electrodes in the respective group being arranged in vertical planes extending substantially parallel to said one wall, the electrodes of one of the three groups being arranged adjacent said one wall of said melting chamber, the second group of electrodes being arranged intermediate said one wall and a wall of said melting chamber opposite said one wall, and the third group of electrodes being arranged adjacent said opposite wall; means for supplying electric energy to the electrodes of each group; and regulating means for regulating at least the energy supplied to said one group of electrodes adjacent said one wall of said melting chamber in such a manner that the energy supplied to said one group is greater than the energy supplied to the two other groups of electrodes so as to produce an updrift in the molten glass in said melting chamber along said one wall and so that molten glass will be circulated in said melting chamber and flow upwardly along said one wall, across the level of molten glass in the melting chamber to said opposite wall, downwardly along said opposite wall and along a bottom wall of said melting chamber toward the passage.

2. An electric glass furnace as set forth in claim 1, and including regulating means for each group of electrodes adjusted in such a manner so as to supply the electrodes in the second group with energy which is greater than the energy supplied to the electrodes than the energy supplied to the electrodes in said third group adjacent said opposite wall.

3. An electric glass furnace as set forth in claim 1, wherein said electrodes are arranged in such a manner that the distance between said electrodes in said one group and the distance between said electrodes in said third group is greater than the distance of each electrode in said second group from the electrodes of the other two groups adjacent to the respective electrodes of the second group.

4. An electric glass furnace as set forth in claim 1, wherein the width of the passage connecting said melting chamber to said working chamber exceeds half the width of said melting chamber.

5. An electric glass furnace as set forth in claim 1, wherein the width of the passage connecting said melting chamber to said working chamber is substantially equal to the width of said melting chamber.

6. An electric glass furnace as set forth in claim 1, wherein said melting chamber is connected by at least two passages to said working chamber and the combined width of said passages exceeds half the width of said melting chamber.

7. An electric glass furnace as set forth in claim 1, wherein said one wall of said melting chamber has an upper surface portion inclined inwardly toward said opposite wall.

8. An electric glass furnace as set forth in claim 1, wherein said means for supplying energy to said three groups of electrodes include three transformers having delta-connected primary windings, and secondary windings respectively connected at opposite ends thereof to the electrodes of the respective group, and said secondary windings being connected intermediate the ends thereof to each other.

9. An electric glass furnace as set forth in claim 8, wherein said regulating means for regulating the energy supplied to each group of electrodes include three voltage regulating means respectively connecting the primary windings of said transformers to a three-phase network.

References Cited

UNITED STATES PATENTS

| | | | |
|---|---|---|---|
| 1,827,471 | 10/1931 | Hitner | 13—6 |
| 2,018,883 | 10/1935 | Ferguson | 13—6 |
| 3,145,246 | 8/1964 | Augsburger | 13—6 |

BERNARD A. GILHEANY, *Primary Examiner.*

H. B. GILSON, *Assistant Examiner.*